United States Patent

Takasan et al.

[11] Patent Number: 5,927,657
[45] Date of Patent: Jul. 27, 1999

[54] ANTENNA MOUNTING STRUCTURE FOR MOVABLE MEMBER CONVEYING SYSTEM

[75] Inventors: Masaki Takasan; Yasuharu Odachi, both of Kariya, Japan

[73] Assignee: Kabushiki Kaisha Toyoda Jidoshokki Seisakusho, Kariya, Japan

[21] Appl. No.: 08/892,755

[22] Filed: Jul. 15, 1997

[30] Foreign Application Priority Data

Jul. 17, 1996 [JP] Japan .................................. 8-187503
Jul. 18, 1996 [JP] Japan .................................. 8-189080

[51] Int. Cl.⁶ .................................................. B61L 15/00
[52] U.S. Cl. ...................... 246/194; 104/88.03; 104/297; 191/10
[58] Field of Search .............................. 246/34 R, 34 B, 246/63 R, 63 C, 63 A, 194; 104/88.02, 88.03, 288, 295, 297, 88.04, 296, 299, 300, 301, 304, 305; 191/10; 336/170, 171

[56] References Cited

U.S. PATENT DOCUMENTS

| | | |
|---|---|---|
| 3,714,419 | 1/1973 | Fosse et al. . |
| 3,942,168 | 3/1976 | Whyte . |
| 4,008,467 | 2/1977 | Pattantyus-Abraham et al. . |
| 4,032,911 | 6/1977 | Melvin, Jr. . |
| 4,331,225 | 5/1982 | Bolger . |
| 4,335,381 | 6/1982 | Palmer ................................. 246/187 A |
| 4,986,187 | 1/1991 | Booth et al. ............................ 104/297 |
| 5,467,718 | 11/1995 | Shibata et al. . |
| 5,539,296 | 7/1996 | Ito . |
| 5,551,350 | 9/1996 | Yamada et al. ............................ 191/10 |
| 5,555,815 | 9/1996 | Young et al. ............................ 104/296 |
| 5,619,078 | 4/1997 | Boys et al. ............................... 191/10 |
| 5,622,339 | 4/1997 | Capan ..................................... 246/194 |
| 5,628,478 | 5/1997 | McConnel et al. ..................... 246/194 |
| 5,709,291 | 1/1998 | Nishino et al. . |

FOREIGN PATENT DOCUMENTS

| | | |
|---|---|---|
| 5-207606 | 8/1993 | Japan . |
| 5-344603 | 12/1993 | Japan ..................................... 191/10 |
| 6153305 | 5/1994 | Japan . |
| 08072709 | 3/1996 | Japan . |
| 872709 | 3/1996 | Japan . |

Primary Examiner—Mark T. Le
Attorney, Agent, or Firm—Morgan & Finnegan, L.L.P.

[57] ABSTRACT

A carriage conveying system having a conveyance control device, which outputs communication signals for supplying a carriage with electric power by a feeder cable arranged along a guide rail to move the carriage along the guide rail and for controlling operation of the carriage. A control device transmits the communication signals to the carriage by the feeder cables. The carriage has a driving device for driving the carriage in accordance with the electric power. A controller controls the driving device in accordance with the communication signals. A communicating device receives the communication signals from the feeder cable for conveyance to the controller. The communicating device is located in the vicinity of the feeder cable.

25 Claims, 9 Drawing Sheets

ANTENNA MOUNTING STRUCTURE FOR MOVABLE MEMBER CONVEYING SYSTEM

BACKGROUND OF THE INVENTION

1. Field of the Invention

The present invention relates to a carriage conveying system, and more particularly, to a carriage conveying system having a feeder cable arranged along a guide rail and a pickup coil provided for the carriage, which produces an induced electromotive force by alternating current applied to the feeder cable to supply electric power for the carriage to move the carriage along the guide rail.

2. Description of the Related Art

There are systems for transporting articles by a carriage moving along a guide rail to facilitate transportation of the articles in factories and warehouses. Normally, an operation motor drives the carriage. An electric driving force for the operation motors is supplied by applying a high frequency alternating current to a feeder cable (trolley cable for supplying electric power) that is arranged along the guide rail.

There are trolley type and non-contact type power supplying methods. In the trolley type method, the electric power is supplied by allowing contact between a collecting element provided for the carriage and the feeder cable. The non-contact method is described in, for example, Japanese Unexamined Patent Publication No. 6-153305. FIG. 15, herein, is representative of the trolley type device of Japanese Publication No. 6-153305. As shown in FIG. 15, a pickup device 53, which is provided for a carriage, moves along a guide rail 51, as shown in FIG. 15. A coil 55 of the pickup device 53 is arranged in the vicinity of a feeder cable 52, and the electric power is supplied by allowing the coil 55 to produce an induced electromotive force.

The trolley type method has problems such as wear of the collecting element, which necessitates maintenance, and dust and sparks. However, the non-contact method does not have these problems. From this point of view, the non-contact method is superior to the trolley type method, and has received more attention recently.

Conveyance of the carriage moving along the guide rail is controlled by instruction signals that are sent by a conveyance control device provided on the ground (or a ground station). The ground station performs the communication required for the conveyance of the carriage with the carriage moving along the guide rail. Such communication employs wireless devices that are provided for the ground station and the carriage. The carriage communicates with the ground station while moving, and the conveyance of the carriage is controlled by the instructions from the ground station.

In this communication method, the guide rail is installed over a large area. Thus, the wireless devices of the ground station must be arranged at optimal locations to assure the communication regardless of the position of the carriage that is moving. This increases the workload and time required for installing the communication cable that connects the wireless devices and the ground station. Furthermore, the workload and time required for choosing the locations for installing the wireless devices of the ground station are also increased to assure communication with the carriage.

Therefore, a communication cable connected to the ground station may be arranged along the guide rail extending parallel with the feeder cable to enable communication between the carriage and the ground station via the communication cable. However, in such cases, installation of the communication cable along the guide rail increases the workload and time required for the wiring of the guide rail. Furthermore, since the collecting element contacts the communication cable, the communication cable and the collecting element become worn. The wear may cause faulty communication. To avoid such problems, the communication cable and the collecting element must be changed periodically. In addition, a larger guide rail is required for installing the communication cable along the rail.

SUMMARY OF THE INVENTION

Accordingly, it is an objective of the present invention to provide a carriage conveying system that enables communication between a carriage and a conveyance control device by superimposing communication signals on alternating current flowing through the feeder cable to supply an electric power for the carriage in a noncontacting manner.

Furthermore, it is another objective of the present invention to provide a carriage conveying system that enables communication between the carriage and the conveyance control device in a preferable and highly reliable state.

To achieve the above objectives, a carriage conveying system of a first embodiment according to the present invention includes a conveyance control device. The conveyance control device outputs communication signals and supplies electric power to a carriage by a feeder cable arranged along a guide rail to cause movement of the carriage along the guide rail and to control operation of the carriage. The communication signals are transmitted to the carriage by the feeder cables. The carriage includes a driving device for driving the carriage in accordance with the electric power. A controller controls the driving device in accordance with the communication signals. A device receives the communication signals from the feeder cable. The communicating device is located in the vicinity of the feeder cable.

A carriage of a carriage conveying system of a second embodiment according to the present invention includes a pickup coil for generating an induced electromotive force by the alternating current flowing through the feeder cable. A driving device drives the carriage by the induced electromotive force, and a controller controls the driving device in accordance with the communication signals. An antenna receives the communication signals from the feeder cable. The antenna is located near the pickup coil.

BRIEF DESCRIPTION OF THE DRAWINGS

The features of the present invention that are believed to be novel are set forth with particularly in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of an unmanned transporting system having a transporting vehicle as a carriage, which moves along a guide rail attached to a ceiling, according to the present invention will now be described with reference to FIGS. 1 to 9.

Figure 1:
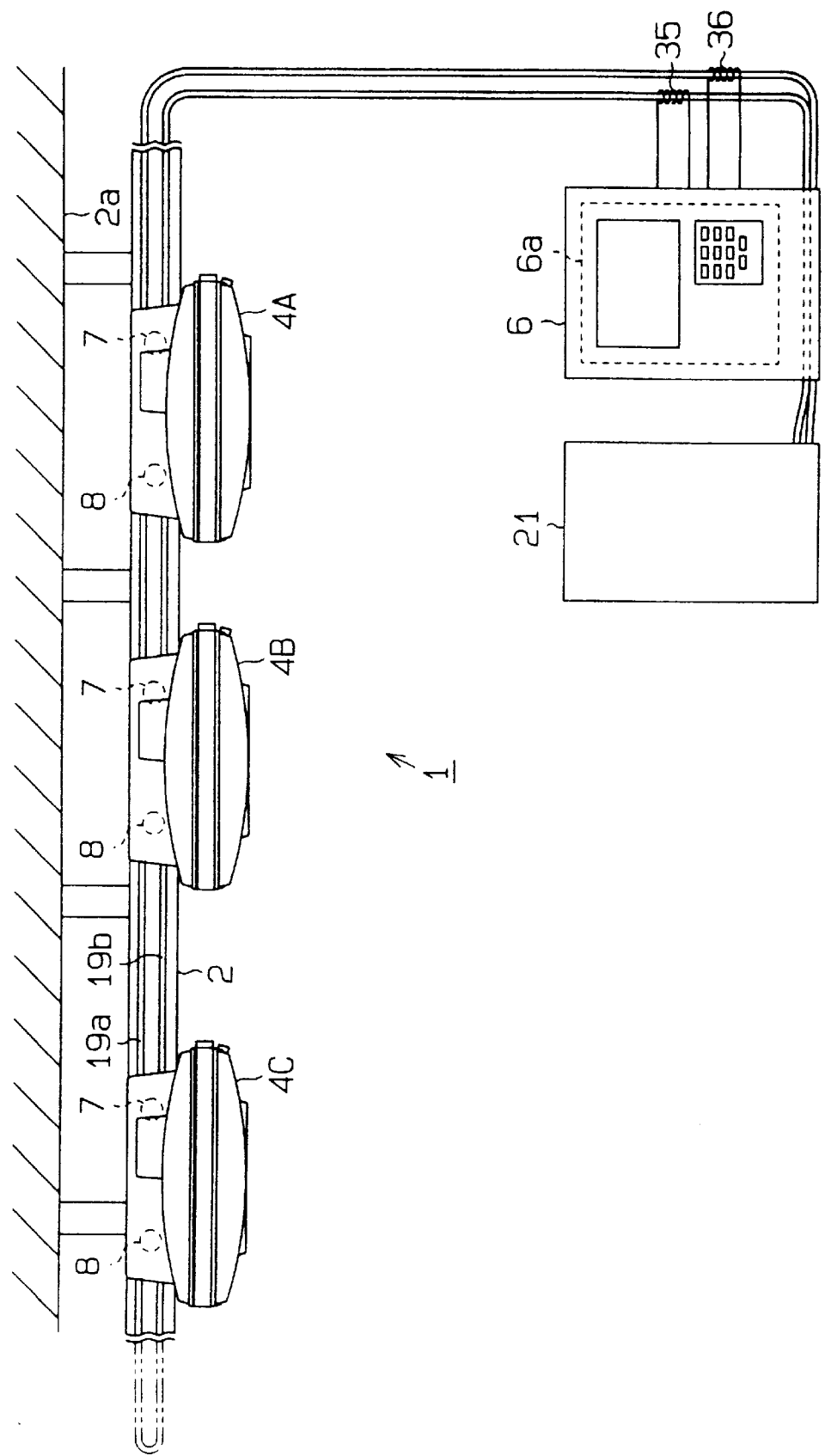
FIG. 1 is a side view showing a layout of an unmanned transporting system of a first embodiment according to the present invention.
Figure 2:
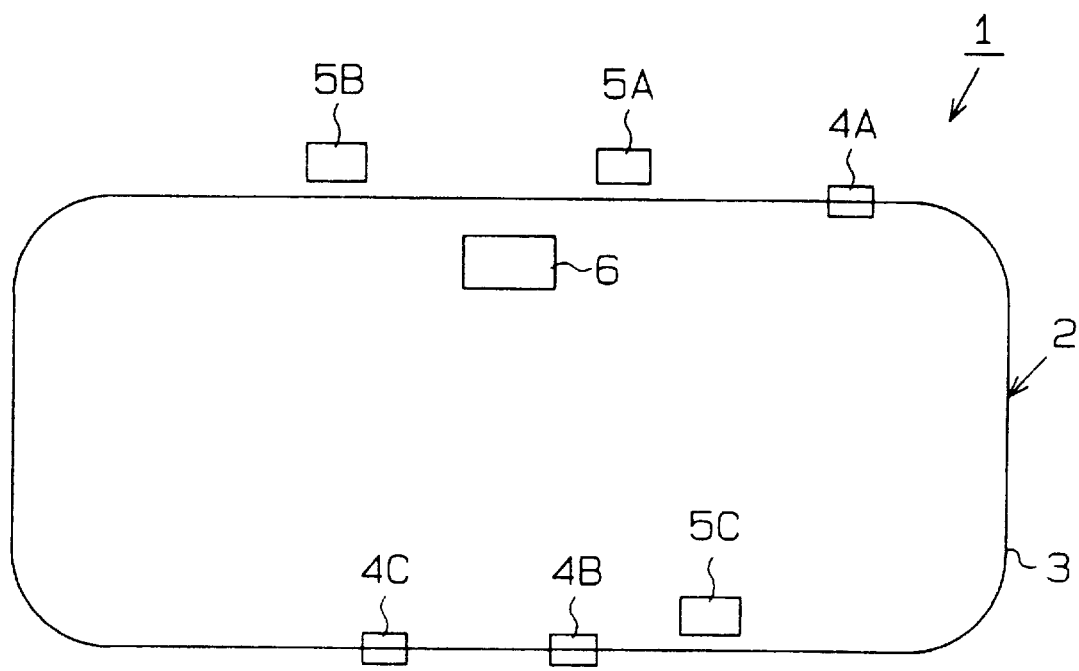
FIG. 2 is a plan view schematically showing the layout of the unmanned transporting system.

FIGS. 1 and 2 show a layout of the transporting system serving as a carriage conveying system. An operation route 2 of a carriage, which is included in a conveying system 1, is defined as a closed loop by a guide rail 3 attached to a ceiling 2a. A plurality of transporting vehicles 4A to 4C, which serve as carriages, move and circulate along the guide rail 3. A plurality of stations 5A to 5C are arranged along the guide rail 3.

A conveyor (not shown) is provided for each station 5A to 5C. Each transporting vehicle 4A to 4C transfers articles from the conveyor at each station 5A to 5C. Operation of each transporting vehicle 4A to 4C and transfer of the articles is controlled as a whole by a conveyance control device 6, which is provided on the ground.

Figure 3:
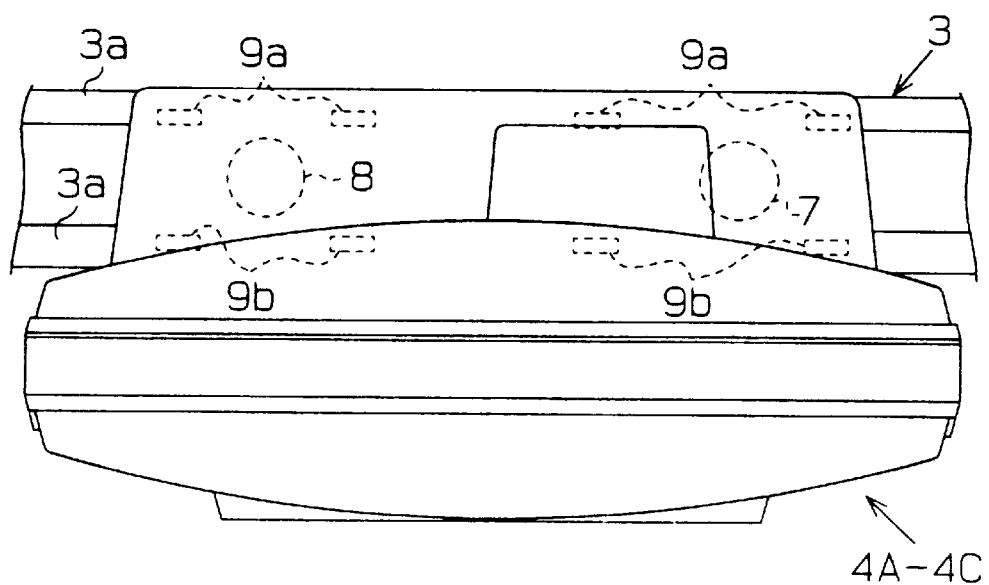
FIG. 3 is a side view showing a transporting vehicle.
Figure 5:
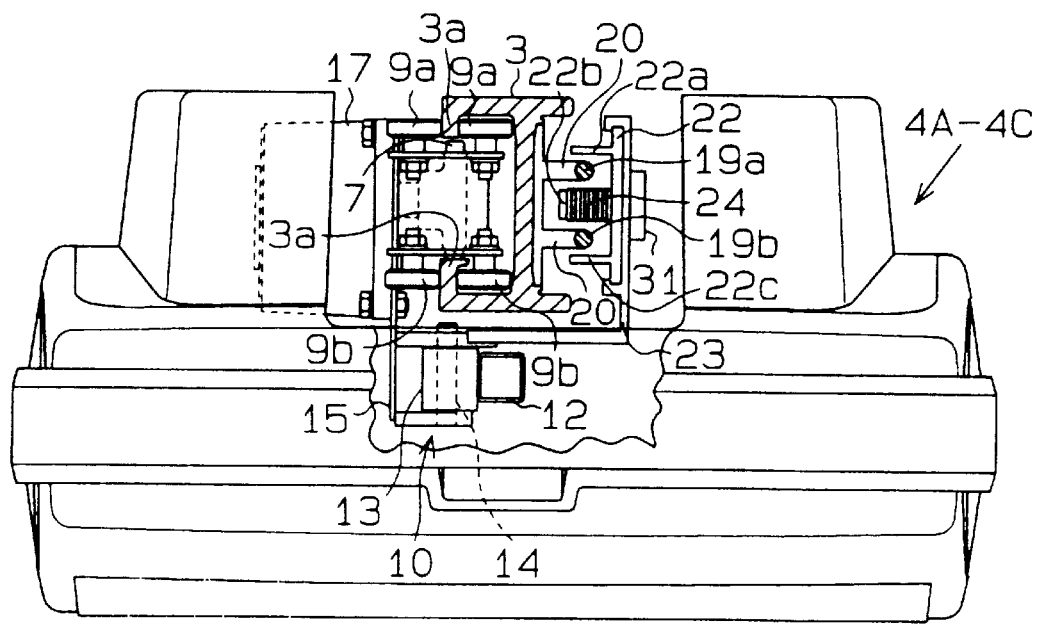
FIG. 5 is a partial exploded front view showing the transporting vehicle.

As shown in FIGS. 3 and 5, each transporting vehicle 4A to 4C includes a driving wheel 7 and a driven wheel 8 serving as traveling wheels that roll along the guide rail 3 and guide wheels 9a, 9b that clamp projections 3a of the guide rail 3. The transporting vehicles 4A to 4C are supported to the guide rail 3 in a suspended state. Each transporting vehicle 4A to 4C is provided with a lifting device (not shown), which lifts or lowers a table carrying the articles by means of a belt.

Figure 6:
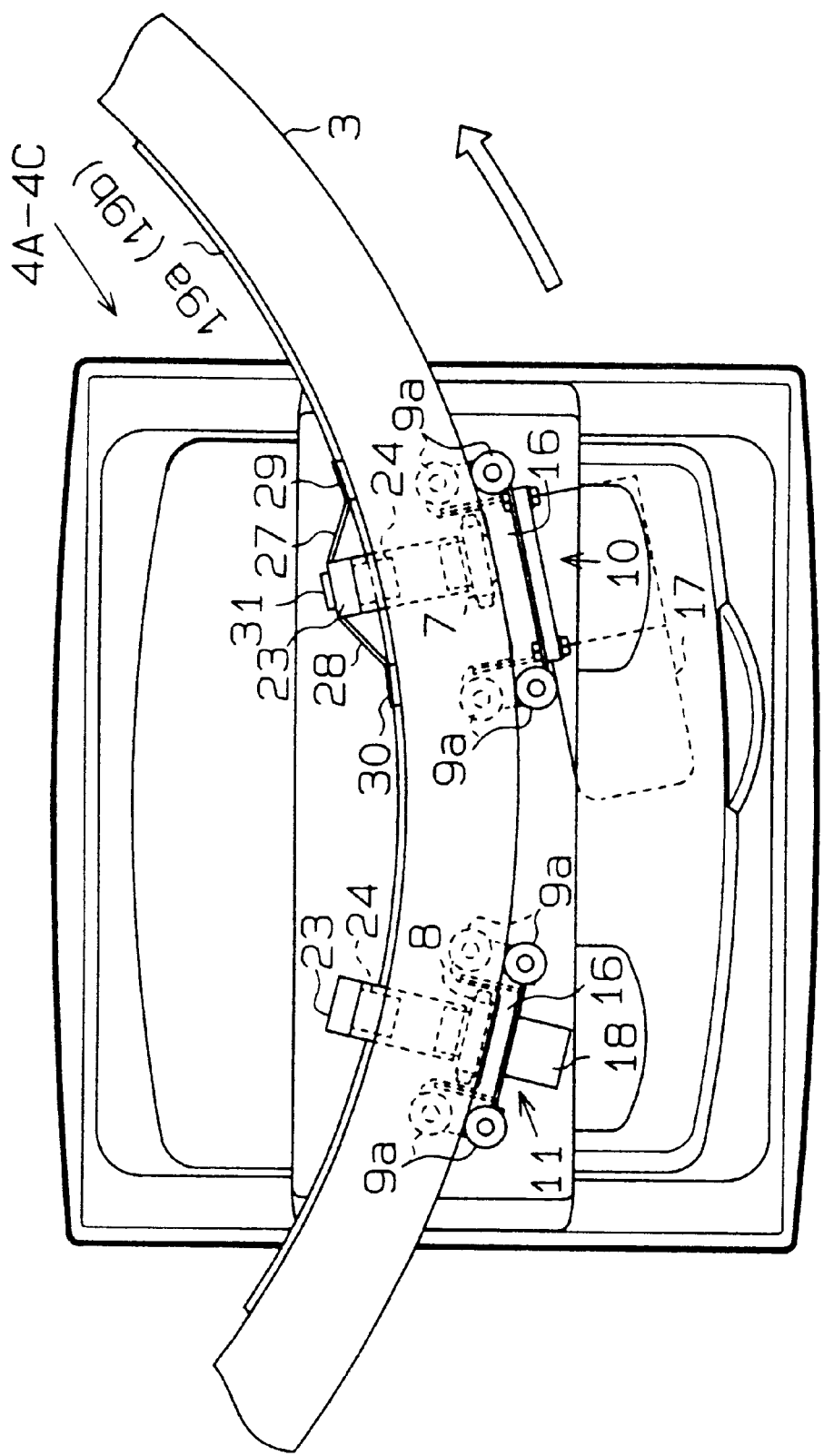
FIG. 6 is a plan view showing the transporting vehicle moving at a curved section.

As shown in FIGS. 5 and 6, the driving wheel 7 and the driven wheel 8 are supported by a pair of steering portions 10, 11, respectively, which are arranged at a front side and a rear side of each transporting vehicle 4A to 4C. As shown in FIG. 5, a support frame 12 made from a square pipe is arranged substantially at the middle of each transporting vehicle 4A to 4C. The support frame 12 extends in the longitudinal direction of each transporting vehicle 4A to 4C below the guide rail 3. A block 13 is fixed to a side of the support frame 12.

Each steering portion 10, 11 includes a support shaft 14 and a support bracket 15. The support shaft 14 is pivotally supported by the block 13, the ends of the support shaft 14 projecting above and below from the block 13. The support bracket 15 is secured to the support shaft 14 and rotates integrally with the support shaft 14. The guide wheels 9a, 9b are pivotally supported by support portions 16, which project from the support bracket 15 toward the guide rail 3. The structure of the steering portions 10, 11 of this embodiment is basically identical with that of the steering portions described in Japanese Unexamined Patent Publication No. 8-72709.

As shown in FIG. 6, an operation motor 17, which has a moderating device, is constituted by a three-phase induction motor. The motor 17 is fixed to the front steering portion 10. The driving wheel 7 is supported by an output shaft of the operation motor 17 and rotates integrally with the output shaft. A bearing 18, which projects outward and is spaced from the guide rail 3, is fixed to the rear steering portion 11. The driven wheel 8 is supported by the bearing 18 via a support shaft. The support shafts 14 of each support portion 10, 11 are arranged with their axes extending substantially in correspondence with the middle of the driving wheel 7 and the driven wheel 8, respectively. The driving wheel 7 is driven by the operation motor 17, and each transporting vehicle 4A to 4C moves along the guide rail 3.

Figure 7:
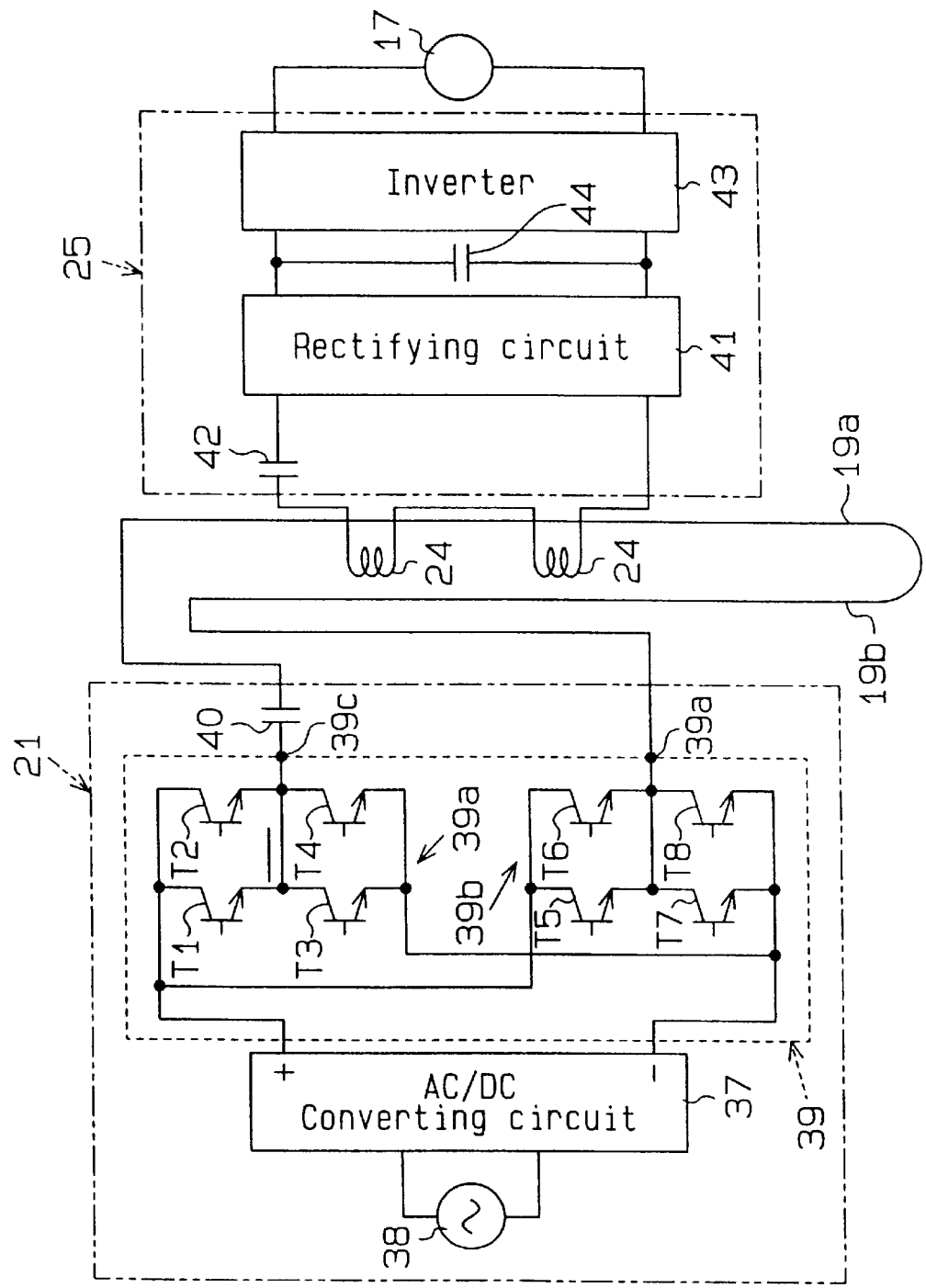
FIG. 7 is a block circuit diagram showing an electric power source device.

As shown in FIGS. 5 and 6, feeder cables 19a, 19b, which are each constituted by a litz cable, are supported by a pair of support arms 20 extending from the opposite side of the guide rail 3 from the driving wheel 7 and the driven wheel 8. The feeder cables 19a, 19b are arranged parallel with each other and are spaced apart by a predetermined interval in the vertical direction. The feeder cables 19a, 19b define ingoing and outgoing lines, as shown in FIG. 7. While the feeder cable 19a arranged at an upper side corresponds to an ingoing line, the feeder cable 19b arranged at a lower side corresponds to an outgoing line. A first end and a second end of the feeder cables 19a, 19b are connected to a power source device 21 provided on the ground. The power source device 21 supplies an alternating current power source for the feeder cables 19a, 19b. Furthermore, in this embodiment, the power source device 21 supplies an alternating current power source of 200 V with a high frequency sine waveform of 10 kilohertz (kHz).

Figure 4:
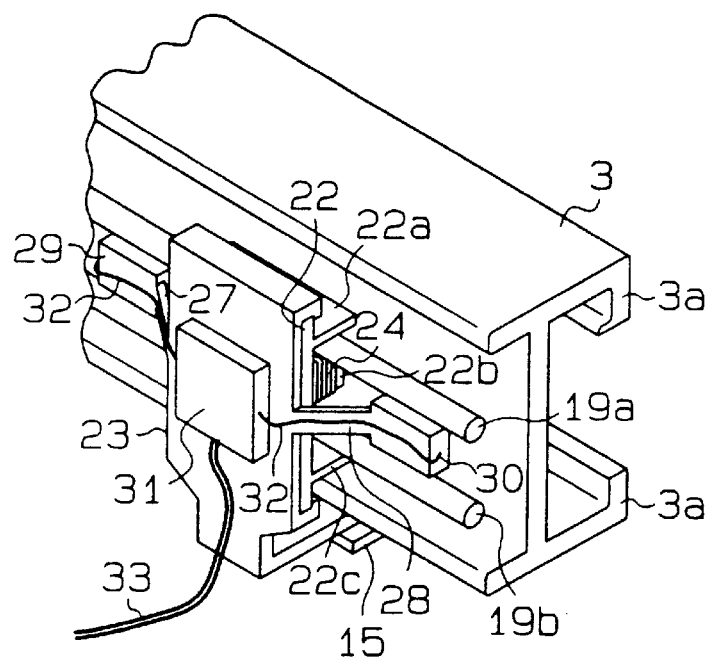
FIG. 4 is a perspective view showing an antenna connected to a modem.

As shown in FIGS. 4 and 5, a pair of feeding cores 22 made from magnetic materials such as ferrite, which have substantially E-shaped cross sections and are opposed to the feeder cables 19a, 19b, are provided on each transporting vehicle 4A to 4C. As shown in FIGS. 5 and 6, another bracket 23 is fixed to each bracket 15, and the brackets 15, 23 define a substantially U-shaped support member. This support member covers a lower side and the lateral sides of the guide rail 3. Each core 22 is supported to an inner side of the bracket 23 of each steering portion 10, 11. A shaft portion 22b, which is arranged at the center of each core 22, is located on a plane that includes the support shaft 14 and extends perpendicular to the guide rail 3.

The upper feeder cable 19a extends between an upper projection 22a and the central shaft portion 22b of each core 22. The lower feeder cable 19b extends between the central shaft portion 22b and a lower projection 22c. A pickup coil or an induction coil 24, is wound around the central shaft portion 22b of each core 22. Thus, the pickup coil 24 changes the magnetic flux of the feeder cables when alternating current flows through the feeder cables 19a, 19b. This allows the pickup coil 24 to generate an induced electromotive force. The induced electromotive force is supplied to a power source device 25 provided for each transporting vehicle 4A to 4C, and the induced electromotive force is then used as the driving power source of the operation motor 17 and also as the driving power source of a conveyance controller 26 provided for each transporting devices 4A to 4C. The pickup coils 24 of the steering portions 10, 11 are connected in series, as shown in FIG. 7.

As shown in FIGS. 4 and 6, support arms 27, 28 are attached to each side of the bracket 23 of the front steering portion 10. A transmission antenna 29 is attached to the distal end of the first support arm 27, and a receptor antenna 30 is attached to the distal end of the second support arm 28. Each antenna 29, 30 is arranged between the feeder cable 19a (ingoing line) and the feeder cable 19b (outgoing line) without contacting the feeder cables 19a, 19b. In this embodiment, each antenna 29, 30 is coiled, and the axis of each coil extends in the same direction as the axis of the pickup coil 24. Each coil is schematically illustrated in a square shape, as shown in FIGS. 4 and 6.

A modem 31 is attached to an outer side of the bracket 23, or an outer side of the core 22. The transmission antenna 29 and the receptor antenna 30 are connected with the modem 31 by a coaxial cable 32. The modem 31 is connected with the conveyance controller 26, including a central processing unit CPU (not shown), by a flexible cable 33 used for serial communication. The transmission antenna 29, the receptor antenna 30, and the modem 31 define an communicating device, which exchanges communication signals between the conveyance control device 6 provided on the ground and the conveyance controller 26 of each transporting vehicle 4A to 4C.

Figure 8:
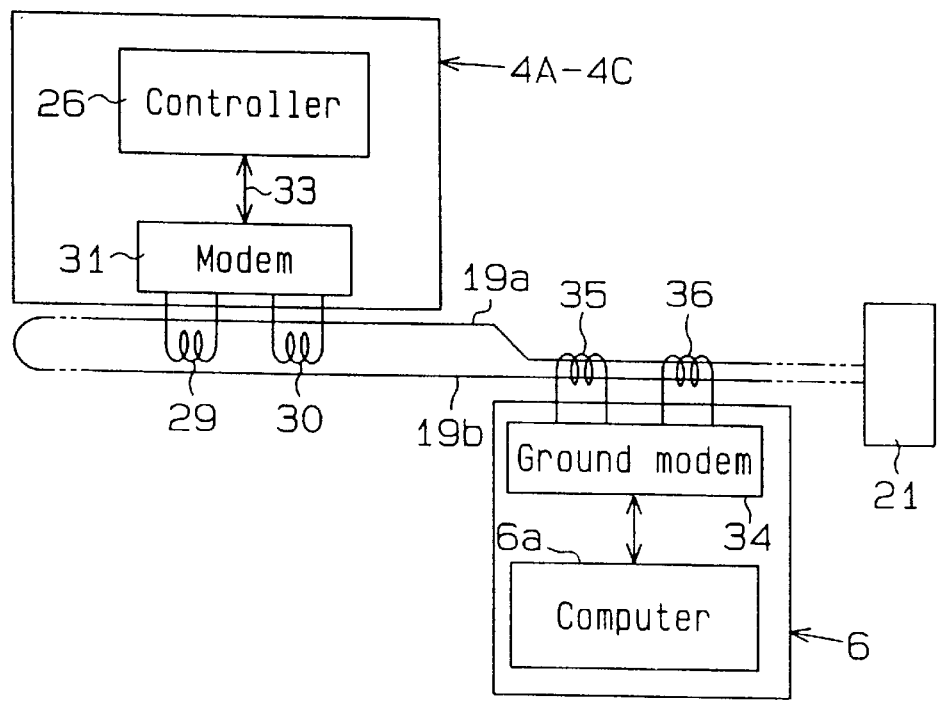
FIG. 8 is a block circuit diagram showing the relation between the modem and feeder cables.

As shown in FIG. 8, the conveyance control device 6 provided on the ground includes a ground modem 34. A ground transmission antenna 35 and a ground receptor antenna 36 are connected with the modem 34. The antennas 35, 36 are coiled and wound around the feeder cables 19a, 19b. The conveyance control device 6 includes a computer 6a. The computer 6a generates digital instruction signals that control the operation and the transfer of the articles of each transporting vehicle 4A to 4C and outputs the instruction signals to the ground modem 34.

The ground modem 34 converts the digital instruction signals received from the conveyance control device 6 into analog signals of 200 to 300 megahertz (MHZ) and outputs the analog signals to the ground transmission antenna 35 as communication signals SG. Furthermore, the ground modem 34 receives the communication signals SG from the transporting vehicles 4A to 4C via the ground receptor antenna 36.

The modem 31 of each transporting vehicles 4A to 4C extracts the communication signals SG from induced electromotive force signals on which the communication signals SG have been superimposed. The modem 31 then converts the communication signals SG into digital signals and outputs the digital signals to the conveyance controller 26 as the instruction signals sent by the conveyance control device 6. Each conveyance controller 26 judges whether the instruction signals from the modem 31 are directed to itself. If the instruction signals are directed to itself, the conveyance controller 26 drives and controls, for example, the operation motor 17 in accordance with the instruction signals.

FIG. 7 shows an electric circuit defined by the ground power source device 21, which supplies a high frequency power to the feeder cables 19a, 19b, and the power source device 25 of each transporting vehicle 4A to 4C. The ground power source device 21 includes an AC/DC converting circuit 37, which converts a three-phase alternating current power source 38 of 200 V, 60 Hz into a direct current power source of 200 V. The resulting direct current power source is applied to a DC/AC converting circuit 39.

The DC/AC converting circuit 39 includes a first drive circuit portion 39a and a second drive circuit portion 39b. The first and second drive circuit portions 39a, 39b are connected in parallel with respect to the AC/DC converting circuit 37. An output terminal 39c of the first drive circuit portion 39a is connected with the first end of the feeder cable 19a by a resonance capacitor 40. An output terminal 39d of the second drive circuit portion 39b is connected with the second end of the feeder cable 19b.

The first drive circuit portion 39a includes two upper transistors T1, T2 and two lower transistors T3, T4. The collectors of the upper transistors T1, T2 are connected with the plus pole of the AC/DC converting circuit 37. The emitters of the lower transistors T3, T4 are connected with the minus pole of the AC/DC converting circuit 37. Furthermore, nodes between the emitters of the upper transistors T1, T2 and the collectors of the lower transistors T3, T4 are connected with the output terminal 39c of the first drive circuit portion 39a.

The second drive circuit portion 39b includes two upper transistors T5, T6 and two lower transistors T7, T8. The collectors of the upper transistors T5, T6 are connected with the plus pole of the AC/DC converting circuit 37. The emitters of the lower transistors T7, T8 are connected with the minus pole of the AC/DC converting circuit 37. Furthermore, nodes between the emitters of the upper transistors T5, T6 and the collectors of the lower transistors T7, T8 are connected with the output terminal 39d of the second drive circuit portion 39b.

A controller, which is not shown, executes on-off control of each transistor T1 to T8 to supply the feeder cables 19a, 19b with electric power having a high frequency sine waveform of 200 V, 10 kHz. The upper transistors T1, T2 of the first drive circuit portion 39a are synchronized with the lower transistors T7, T8 of the second drive circuit portion 39b when the on-off control is executed. The lower transistors T3, T4 of the first drive circuit portion 39a are synchronized with the upper transistors T5, T6 of the second drive circuit portion 39b when the on-off control is executed. For example, when the upper transistors T1, T2 and the lower transistors T7, T8 are turned on, the lower transistors T3, T4 and the upper transistors T5, T6 are turned off. In contrast, when the upper transistors T1, T2 and the lower transistors T7, T8 are turned off, the lower transistors T3, T4 and the upper transistors T5, T6 are turned on.

In the power source device 25 provided for each transporting vehicle 4A to 4C, a series circuit, which is defined by the pair of pickup coils 24 and an output regulating capacitor 42, is connected with the input terminal of a rectifier circuit 41. The output terminal of the rectifier circuit 41 is connected with the operation motor 17 by an inverter 43. A smoothing capacitor 44 is interposed between the rectifier circuit 41 and the inverter 43. The inverter 43 is controlled by instructions of each conveyance controller 26. Thus, the three-phase alternating current power source, the frequency of which has been changed, is supplied to the operation motor 17.

The operations of the unmanned transporting system constructed as above will hereafter be described.

Figure 9:
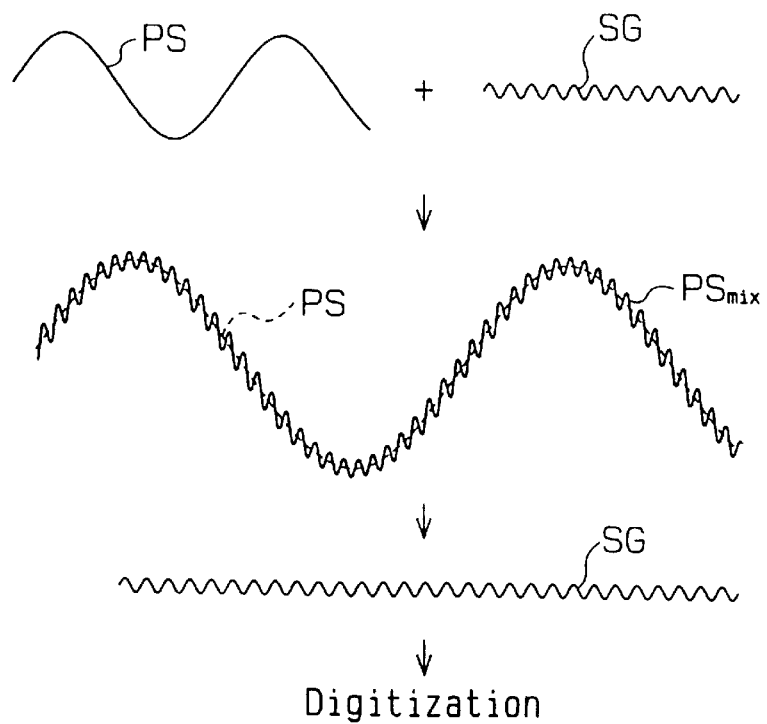
FIG. 9 is a schematic view showing communication signals superimposed on a waveform of current.

As shown in FIG. 8, the conveyance control device 6 generates the instructions for controlling the operation and the transfer of the articles by each transporting vehicle 4A to 4C, and outputs the instructions to the ground modem 34 as the digital instruction signals. The ground modem 34 converts the digital instruction signals into the analog signals of 200 to 300 MHZ and outputs the analog signals to the ground transmission antenna 35 as the communication signals SG. After the ground modem 34 outputs the communication signals SG to the ground transmission antenna 35, the communication signals SG of 200 to 300 MHZ are superimposed on a waveform PS of the 10 kHz current flowing through the feeder cables 19a, 19b. The signals are superimposed as shown in FIG. 9. A current waveform $PS_{mix}$, which the communication signals SG have been superimposed on, flows through the feeder cables 19a, 19b.

The receptor antenna 30 of each transporting vehicle 4A to 4C generates a weak induced electromotive force that corresponds to the current waveform $PS_{mix}$. The electromotive force is output to the modem 31 provided on each transporting vehicle 4A to 4C. The modem 31 extracts the communication signals SG from the electromotive force, converts the communication signals SG to digital signals, and outputs the digital signals to the conveyance controller 26 as the instruction signals sent by the conveyance control device 6. Each conveyance controller 26 judges whether the signals received from the modem 31 are directed to itself. If the signals are directed to itself, the conveyance controller 26 drives and controls, for example, the operation motor 17 in accordance with the instruction signals. When the transporting vehicles 4A to 4C are operated, each conveyance controller 26 outputs control signals to the inverter 43 to control the rotation of the operation motor 17.

The conveyance controller 26 of each transporting vehicle 4A to 4C outputs digital signals, which indicate a state of operation of the coordinated transporting vehicles 4A to 4C, to the modem 31. The modem 31 converts the digital signals into the analog signals of 200 to 300 MHZ, and outputs the analog signals to the transmission antenna 29 as the communication signals SG. After the modem 31 outputs the communication signals SG to the transmission antenna 29, the communication signals SG of 200 to 300 MHZ are superimposed on the waveform PS of the 10 kHz current flowing through the feeder cables 19a, 19b. As described above, the current waveform $PS_{mix}$, on which the communication signals SG have been superimposed, flows through the feeder cables 19a, 19b.

The ground receptor antenna 36, which is wound around the feeder cables 19a, 19b, generates a weak induced electromotive force that corresponds to the current waveform $PS_{mix}$. The electromotive force is output to the ground modem 34. The ground modem 34 extracts the communication signals SG from the electromotive force signals on which the communication signals have been superimposed, converts the communication signals SG to digital signals, and outputs the digital signals to the conveyance control device 6 as the signals sent by each transporting vehicle 4A to 4C. The conveyance control device 6 acquires the state of the operation of each transporting vehicle 4A to 4C by the signals received from each transporting vehicle 4A to 4C. The conveyance control device 6 then renews the instruction signals, and outputs the signals to the modem 34.

The operation motor 17 is driven by the inverter 43 in accordance with the control signals sent by the conveyance controller 26, and each transporting vehicle 4A to 4C moves along the guide rail 3. This enables the articles to be transported between the prescribed stations.

The guide wheels 9a, 9b, which are provided on the steering portions 10, 11, clamp the projection 3a of the guide rail 3. Thus, at a curved section of the guide rail 3, the steering portions 10, 11 pivot about the support shafts 14 in accordance with the curvature of the curved section, as shown in FIG. 6. In this state, the steering portions 10, 11 pivot relatively to a body of each transporting vehicle 4A to 4C.

If the pickup coil 24, the transmission antenna 29, and the receptor antenna 30 are fixedly attached to portions other than the steering portions 10, 11, variation of the distances from the pickup coil 24, the transmission antenna 29, and the receptor antenna 30 to the feeder cables 19a, 19b are increased at the curved section. Thus, the induced electromotive force generated by the pickup coil 24 becomes unstable. Furthermore, a state of reception by the receptor antenna 30 and a state of transmission by the transmission antenna 29 also become unstable.

However, in this embodiment, the pickup coil 24, the transmission antenna 29, and the receptor antenna 30 are attached to the steering portions 10, 11. This enables the pickup coil 24, the transmission antenna 29, and the receptor antenna 30 to pivot integrally with the steering portions 10, 11 at the curved section. This reduces the variation of the positions of the pickup coil 24, the transmission antenna 29, and the receptor antenna 30 with respect to the feeder cables 19a, 19b. Thus, the electromotive force generated by the pickup coil 24 is stable. Furthermore, the signal superimposition by the transmission antenna 29 becomes highly efficient, and the reception by the receptor antenna 30 becomes highly sensitive.

In short, the following effects may be obtained from this embodiment.

Since the transmission antenna 29 and the receptor antenna 30 are attached to the steering portion 10, the antennas 29, 30 rotate integrally with the steering portion 10 when each transporting vehicle 4A to 4C travels at the curved section of the guide rail 3. Thus, the distances defined by the antennas 29, 30 and the feeder cables 19a, 19b at the curved section does not significantly vary from the corresponding distances defined when each transporting vehicle 4A to 4C travels at a straight section of the guide rail 3. This causes the reception by the receptor antenna 30 to be highly sensitive and the signal superimposition by the transmission antenna 29 to be highly efficient.

Since the transmission antenna 29, the receptor antenna 30, and the modem 31 are fixed to the same steering portion 10, the distances defined by the antennas 29, 30 and the modem 31 do not change when the steering portion 10 is pivoted. This prevents a tension from being applied to the coaxial cable 32. Therefore, durability of the coaxial cable 32, which has poor resistance to bending, is increased and the reliability of communications is also increased.

The pickup coil 24 is wound around the central shaft portion 22b of the feeding core 22, the cross section of which is substantially E-shaped. The modem 31 is attached to the outer side of the core 22. Thus, the shielding effect of the core 22 reduces interference with the modem 31 by noise.

Since the modem 31 is attached to the steering portion 10, space for installing the modem 31 within the body of each transporting vehicle 4A to 4C is free. This allows a wider range of choice for locations of a relay, a sequencer or the like, which are provided within the body.

The feeder cables 19a, 19b are arranged parallel with each other with a predetermined interval and constitute ingoing and outgoing lines. Furthermore, the antennas 29, 30 are located between the feeder cables 19a, 19b, which extend parallel with each other. This makes the reception by the receptor antenna 30 highly sensitive and the signal superimposition by the transmission antenna 29 highly efficient.

The cross section of the feeding core 22 is substantially E-shaped. The feeder cables 19a, 19b extend parallel with each other and on opposite sides of the central shaft portion 22b, about which the pickup coil 24 is wound. The electric current flows in opposite directions through the feeder cables 19a, 19b. Thus, magnetic flux generated by the feeder cables 19a, 19b passes the central shaft portion 22b in the same direction. Therefore, the induced electromagnetic force is generated efficiently by the magnetic flux crossing the pickup coil 24.

For communication between the transporting vehicles 4A to 4C and the conveyance control device 6, the waveform PS of the high frequency current flowing through the feeder cables 19a, 19b is used as a carrier wave, and the communication signals SG are superimposed on the waveform PS. Furthermore, the waveform PSmix of the current on which the communication signals SG have been superimposed is received by the receptor antennas 30, 36. The communication signals SG are then extracted and converted to digital signals by the modems 31, 34, and output to each conveyance controller 26 and the conveyance control device 6, respectively. This eliminates the need for a communication cable that is used only for communication between each transporting vehicle and the conveyance control device. A communication trolley cable also need not be provided beside the guide rail 3. Furthermore, since the communication cable is eliminated, the guide rail 3 may be smaller, and the structure of the guide rail 3 is simplified.

The communication signals SG are superimposed on the alternating current flowing through the feeder cables 19a, 19b. This assures communication between each transporting vehicle 4A to 4C and the conveyance control device 6 regardless of the locations of the transporting vehicles 4A to 4C on the operation route 2.

The transmission and receptor antennas 29, 30, which are provided on each transporting vehicle 4A to 4C, do not contact the feeder cables 19a, 19b. This prevents the feeder cables 19a, 19b and the transmission and receptor antennas 29, 30 from becoming worn. Thus, it is not necessary to change these parts because of wear.

A second embodiment according to the present invention will now be described with reference to FIGS. 10 to 12. The features that are different from those of the first embodiment will be mainly described.

In this embodiment, the steering portion 10 pivotally supports each transporting vehicle by a pivot pin 61, which is provided on each transporting vehicle 4A to 4C, through a bearing 62.

Figure 10:
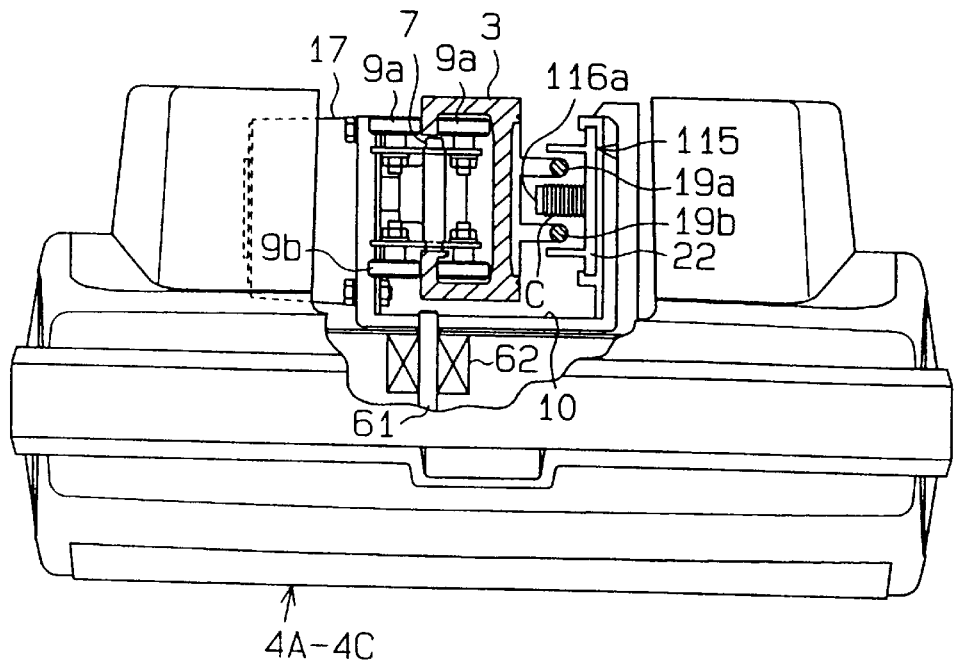
FIG. 10 is a partial exploded front view showing a transporting vehicle of a second embodiment according to the present invention.
Figure 11:
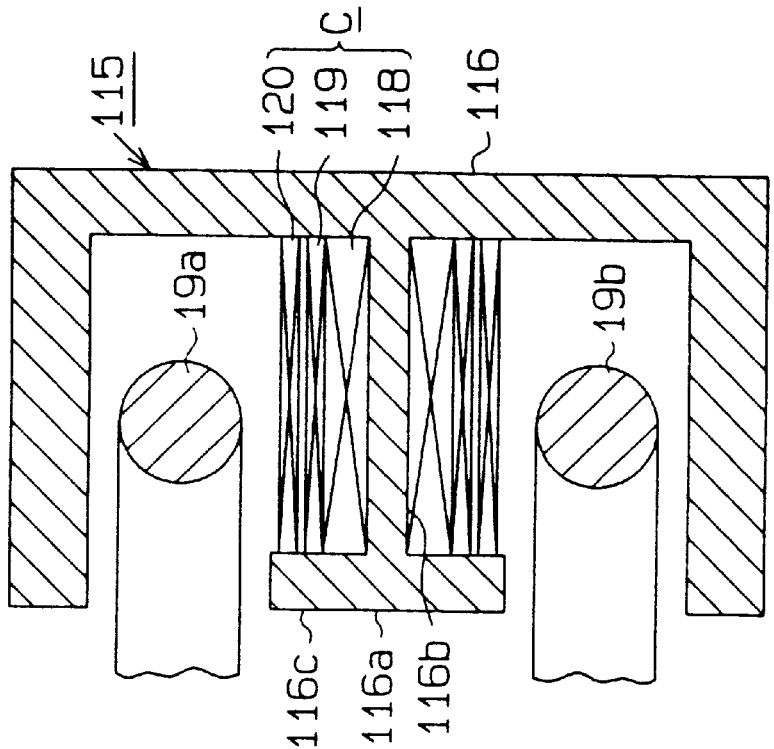
FIG. 11 is a partial enlarged cross-sectional view showing a pickup device of the transporting vehicle of FIG. 10.

As shown in FIGS. 10 and 11, a pickup device 115 includes a ferrite core 116 that has a substantially E-shaped cross section. A projection 116a, which projects from the center of the ferrite core 116, has a T-shaped cross section defined by a shaft portion 116b and a restricting portion 116c provided on the distal end of the shaft portion 116b. Coil group C is wound around the shaft portion 116b, and the axial displacement of the coil group C is restricted by the restricting portion 116c.

The coil group C includes a feeding coil 118, a receptor antenna coil 119, and a transmission antenna coil 120. The coils 118, 119, 120 are concentrically wound around the substantially entire shaft portion 116b in a layered manner. Specifically, the feeding coil 118, the receptor antenna coil 119, and the transmission antenna coil 120 are wound around the shaft portion 116b sequentially in that order. Therefore, the transmission coil 120 is located nearest to the feeder cables 19a, 19b.

Figure 12:
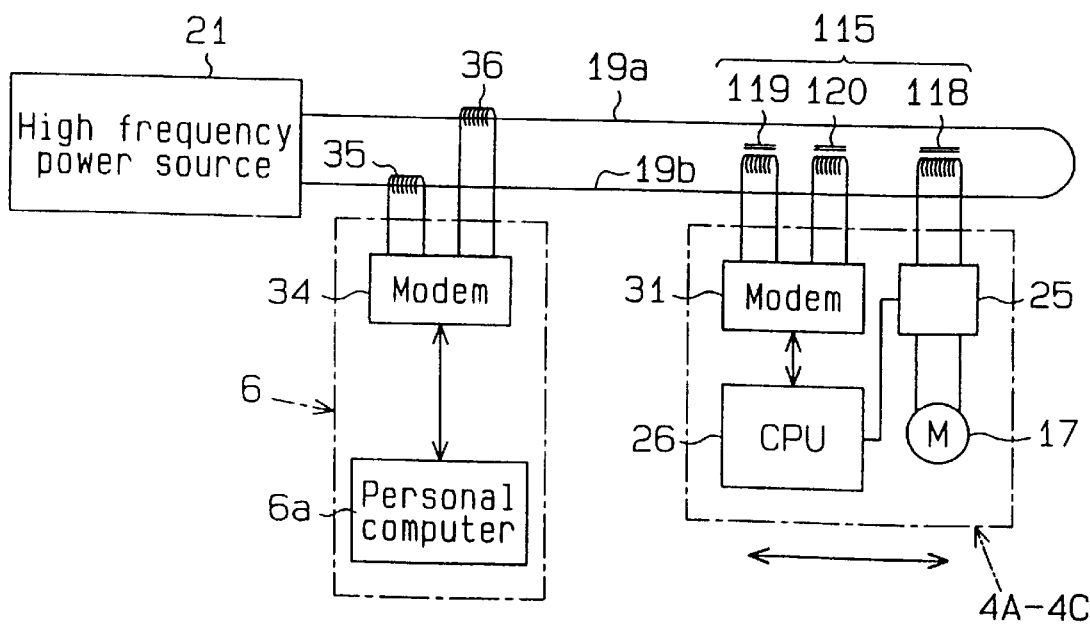
FIG. 12 is a block circuit diagram showing the relationship between a modem and feeder cables of the second embodiment.

FIG. 12 shows an electric circuit of the transporting system 1. In the drawing, only one of the transporting vehicles 4A to 4C is shown. As seen by comparing FIG. 12 with FIG. 8, the ground conveyance control devices 6 of the two embodiments have substantially identical structures.

Each transporting vehicle 4A to 4C is provided with the modem 31, which connects the receptor antenna coil 119 and the transmission antenna coil 120. The modem 31 is installed internally in each transporting vehicle 4A to 4C.

In the transporting system 1 constructed as described above, the operations of the pickup device 115 are substantially identical with those of the pickup device of the first embodiment. Therefore, the operation of the pickup device 115 will not be described herein.

When the transporting vehicles 4A to 4C travel along a curved section of the operation route 2, each wheel 7, 8, 9a, 9b is steered to follow the curve, and each steering portion 10, 11 pivots relatively to each transporting vehicle 4A to 4C. In this state, each pickup device 115 pivots integrally with each steering portion 10, 11 to change its orientation in a tangential direction with respect to the feeder cables 19a, 19b.

Figure 14:
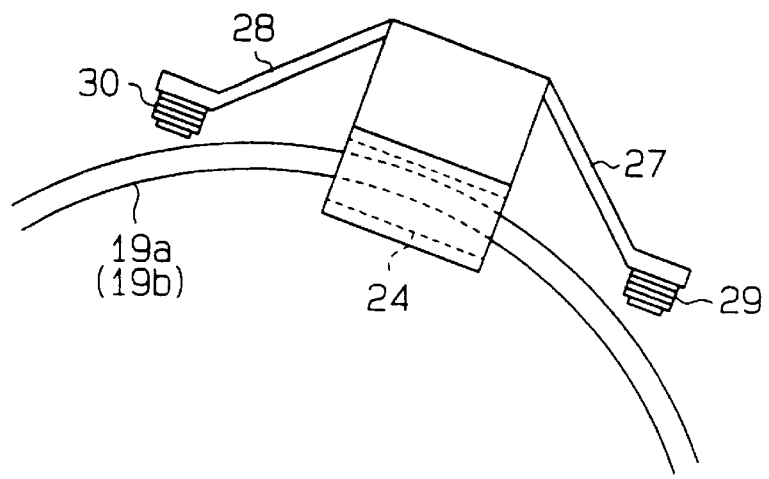
FIG. 14 shows the relationship between an antenna coil and feeder cables when the transporting vehicle of FIG. 6 moves along another curved section.
Figure 15:
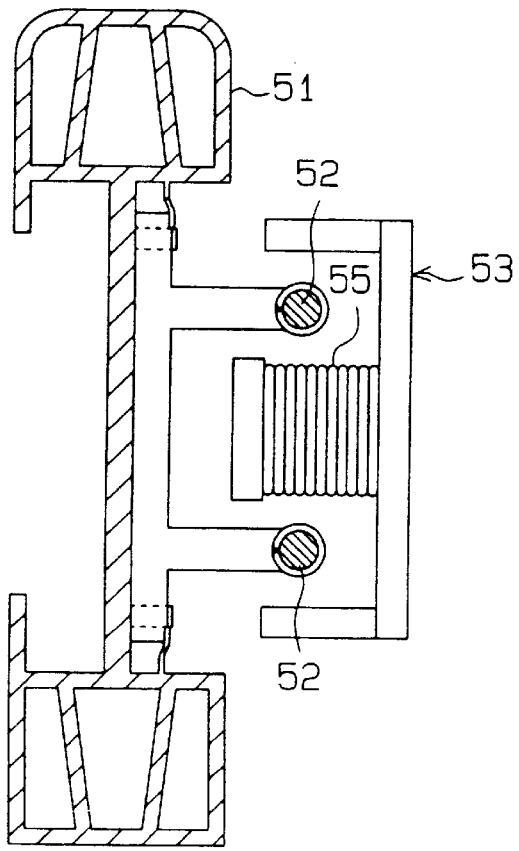
FIG. 15 is a partial cross-sectional view schematically showing a prior art unmanned transporting system.

In the first embodiment, when each transporting vehicle 4A to 4C travels along a curved section having a small radius of curvature, the antenna coils 29, 30 are separated from the feeder cables 19a, 19b, as shown in FIG. 14.

However, in the second embodiment, each coil 118 to 120 is prevented from being separated from the feeder cables 19a, 19b at the curved section. Thus, the distances between each antenna coil 119, 120 and the feeder cables 19a, 19b at the curved sections are maintained substantially equal to the corresponding distances that exist when the vehicles 4A to 4C run along the straight section. Thus, even when the communication is performed when each transporting vehicle 4A to 4C travels along the curved section, attenuation of the signal intensity between the antenna coils 119, 120 and the feeder cables 19a, 19b is substantially equal to that of the straight section.

Furthermore, each antenna coil 119, 120 is arranged at the outer side of the feeding coil 118 and is located nearer to the feeder cables 19a, 19b than the feeding coil 118. This further decreases the attenuation of the signal intensity between the antenna coils 119, 120 and the feeder cables 19a, 19b in comparison to when each antenna coil is arranged at the inner side of the feeding coil.

In addition, the transmission antenna coil 120 is arranged at the outer side of the antenna coil 119 and is located nearest to the feeder cables 19a, 19b. Normally, when communication is performed between two points that are separated by a predetermined interval, the signal intensity is attenuated more significantly during the transmission than during the reception. However, in this embodiment, the distance between the transmission antenna coil 120 and the feeder cables 19a, 19b is smaller than the distance between the receptor antenna coil 119 and the feeder cables 19a, 19b. This reduces the attenuation of the signal intensity particularly during the transmission. Therefore, reliability of the transmission by each transporting vehicle 4A to 4C is increased, and the reliability of the entire communication is further increased.

The coils 118, 119, 120 of the pickup device 115 are located on an opposite side of a wall of the guide rail 3 from the guide wheels 9a, 9b. Each pair of guide wheels 9a, 9b straddles the coils 118, 119, 120. Thus, when traveling at the curved section, each coil is located along a normal line with respect to the curve, and the position of each coil is maintained regardless of the curvature. This further suppresses the displacement of the position of each coil with respect to the feeder cables 19a, 19b.

To improve the feeding efficiency, each antenna coil 119, 120 is wound around the ferrite core 116, which is shaped to facilitate collection of the magnetic flux (in this embodiment, the cross section of the core 116 is substantially E-shaped). This increases the density of the magnetic flux that passes each coil 119, 120 in comparison with the first embodiment, which is shown in FIG. 4. In this manner, the attenuation of the signal intensity is also minimized.

Each antenna coil 119, 120 is arranged within the ferrite core 116 and shielded from the exterior. This reduces leakage of the signals to the exterior to suppress noise interference from the exterior.

The antenna coils 119, 120 and the feeding coil 118 share the same core 116. This eliminates the need for a core provided particularly for the antenna coils 119, 120 or the need for a member to support the core, which reduces the number of parts.

Furthermore, the present invention is not restricted to the above described embodiments, and may be embodied as follows without departing from the spirit or scope of the invention.

Figure 13:
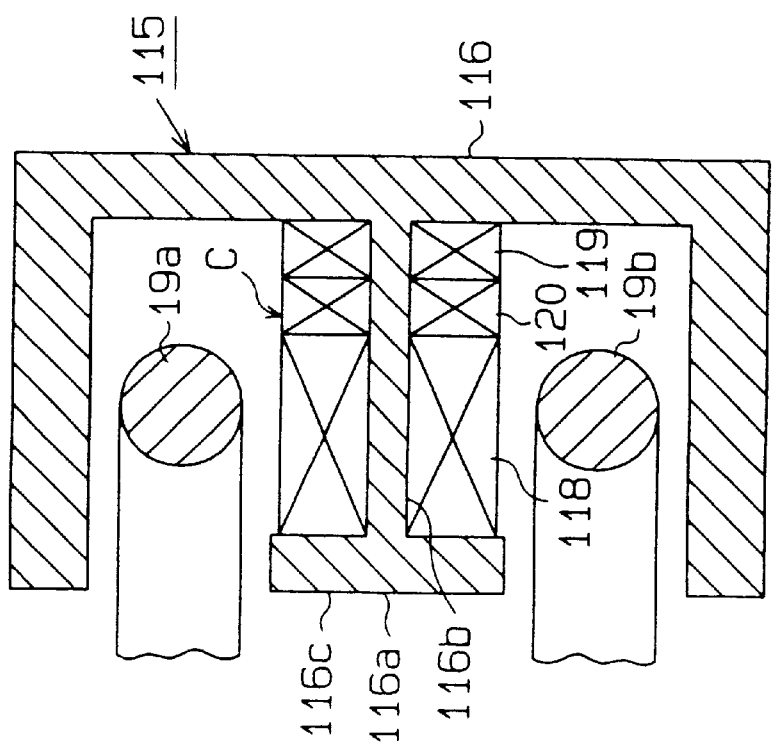
FIG. 13 is a partial enlarged cross-sectional view showing a pickup device of another embodiment.

As shown in FIG. 13, the feeding coil 118 and the antenna coils 119, 120 may be arranged in a row in the axial direction of the core 116b of the core 116. In such a case, as shown in FIG. 13, the transmission antenna coil 120 should be located nearer to the feeder cables 19a, 19b than the receptor antenna coil 119. In this structure, the feeding coil 118 and the antenna coils 119, 120 are wound around the same ferrite core 116. This improves the reliability of the communication at the curved section. Furthermore, since the transmission antenna coil 120 is located nearer to the feeder cables 19a, 19b than the receptor antenna coil 119, the attenuation of the signal intensity is further reduced during the transmission. Thus, the reliability of the communication is further improved.

The feeding core 22 of the first embodiment may be provided on one of the steering portions 10, 11. The transmission antenna 29, the receptor antenna 30, and the modem 31 may be attached to the other steering portion, which is not provided with the core 22. In such a case, the antennas 29, 30 may be attached to the center of the bracket fixed to the steering portion like the feeding core 22. This further reduces the variation of the distances defined by the antennas 29, 30 and the feeder cables 19a, 19b when the transporting vehicles 4A to 4C travel between the straight portion and the curved portion of the guide rail 3. Thus, the reception performed by the receptor antenna 30 is more stable, and the signal superimposition by the transmission antenna 29 is also more stable.

Although each antenna is coiled in the above embodiments, the shape of the antenna is not restricted to a coiled shape. The antennas may be shaped as bars or plates in accordance with an attachment space or the like. If the antennas are shaped as bars or plates in the second embodiment, the antennas may be attached to the projection 116a of the core by winding the feeding coil around the antennas.

The transmission antenna and the receptor antenna of each transporting vehicle may be provided as one antenna. In the same manner, the ground transmission antenna 35 and the ground receptor antenna 36 may be provided as one antenna.

Although the ground transmission antenna 35 and the ground receptor antenna 36 are wound around the feeder cables 19a, 19b, the antennas 35, 36 may be located between the feeder cables 19a, 19b like the transmission antenna 29 and the receptor antenna 30 of each transporting vehicle.

Pairs of guide wheels 9a, 9b are arranged at the upper side and the lower side of each steering portion 10, 11. However, either the pairs of upper guide wheels or the pairs of lower guide wheels may be eliminated. Alternatively, the number of guide wheels 9a, 9b may each be restricted to one pair that is arranged in the vicinity of the driving wheel 7 and the driven wheel 8. This reduces the number of the guide wheels 9a, 9b and simplifies the structure in comparison with the illustrated embodiments.

The support shaft 14 of each steering portion 10, 11 may be located at positions other than the position at which the axis of the shaft portion 14 extends substantially in correspondence with the vertical axis of the driving wheel 7 or the driven wheel 8.

The present invention is embodied as an unmanned transporting system having the guide rail 3 attached to a ceiling and the transporting vehicles 4A to 4C traveling along the guide rail 3. However, the present invention may be embodied as an unmanned transporting system or a stacker crane for an automatic warehouse having a guide rail provided on the ground, and the transporting vehicles travel along the guide rail.

In the first embodiment, the feeder cables 19a, 19 are arranged parallel with each other and near each other to define the ingoing and outgoing lines. However, the two feeder cables may be spaced to prevent the magnetic fluxes, which are generated by the current flowing through the feeder cables, from interfering with each other. Then, the current is applied to each feeder cable in the same direction. Furthermore, each pickup coil 24 may be arranged at a location that allows a magnetic flux generated by one of the feeder cables to be picked up on the associated transporting vehicle.

The number of the feeder cables may be one, and the cross section of the core 22 is not restricted to an E-shape. The core 22 may have, for example, a C-shaped cross section. The number of transporting vehicles may be changed as required. If only one feeder cable is provided, employing a C-shaped core body allows the magnetic flux to be collected to the core effectively. This improves the reliability of the communication. Furthermore, the material of the core is not restricted to ferrite, and other materials may be used as required.

In the second embodiment, one of the communication antennas and the feeding coil, which define the coil group C, may be wound around portions other than the projection 116a of the ferrite core 116. The entire feeding coil and the entire communication antennas need not be wound around the same axis, and two antennas may share a portion of one shaft portion. For example, a plurality of shaft portions may be provided on the core, and the feeding coil and the communication coil may be wound around the separate shaft portions. Then, a portion of one of the coils may be wound around the shaft around which the other coil is wound around. In either case, the displacement of the communication antennas with respect to the feeder cables may be minimized at the curved section.

In each embodiment, if a one-way communication method is employed allowing the transporting vehicles 4A to 4C only to receive instruction signals from the ground conveyance control device 6, only the receptor antenna coil is wound around the core together with the feeding coil.

Although several embodiments of the present invention have been described herein, it should be apparent to those skilled in the art that the present invention may be embodied in many other specific forms without departing from the spirit or scope of the invention. The present invention is not intended to be restrictive to the above description and may be modified within the scope of the appended claims.

What is claimed is:

1. A carriage conveying system comprising a conveyance control device and a carriage, the conveyance control device outputting communication signals and supplying electric power to the carriage by a feeder cable arranged along a guide rail for causing movement of the carriage along the guide rail and for controlling operation of the carriage, wherein the communication signals are transmitted to the carriage by the feeder cable, said carriage comprising:

a driving device for driving the carriage in accordance with the electric power;

a controller for controlling the driving device in accordance with the communication signals; and a communicating device for receiving the communication signals from the feeder cable in a non-contact manner and conveying the communication signals to the controller, wherein the communicating device is located in the vicinity of the feeder cable.

2. A carriage conveying system comprising:

a guide rail;

a feeder cable arranged along the guide rail;

a carriage; and a conveyance control device for supplying electric power and outputting first communication signals to the carriage by a feeder cable for causing movement of the carriage along the guide rail and for controlling operation of the carriage, wherein the first communication signals are transmitted to the carriage by the feeder cable;

the carriage comprising:

a driving device for driving the carriage in accordance with the electric power;

a controller for controlling the driving device in accordance with the first communication signals and for outputting second communication signals to the conveyance control device by the feeder cable; and a communicating device for receiving the first communication signals from the feeder cable for conveyance to the controller and for receiving the second communication signals from the controller and transmitting the second communication signals to the feeder cable for conveyance to the conveyance control device.

3. The carriage conveying system as set forth in claim 1, wherein:

the communicating device includes an antenna and a modem, the antenna for receiving the communication signals from the feeder cable; and the modem for transmitting the communication signals from the antenna to the controller and for performing an analog/digital conversion of the communication signals when transmitting the communication signals to the controller.

4. The carriage conveying system as set forth in claim 3, wherein:

the electric power supplied for the carriage is an alternating current;

the carriage includes a core made from a magnetic material and a pickup coil wound around the core, the pickup coil generating an induced electromotive force from the alternating current supplied by the feeder cable; and the driving device is driven in accordance with the induced electromotive force.

5. The carriage conveying system as set forth in claim 4, wherein the core includes a substantially E-shaped cross section and a shaft portion arranged at the middle of the core, the pickup coil being wound around the shaft portion.

6. The carriage conveying system as set forth in claim 5, wherein:

the steering device includes a first steering portion and a second steering portion arranged in the longitudinal direction of the guide rail;

each steering portion substantially encompasses the guide rail and includes a substantially U-shaped support member pivotally supported to the carriage; and the support member of each steering portion pivotally supports the traveling wheel.

7. The carriage conveying system as set forth in claim 6, wherein:

the first steering portion supports the core, the pickup coil, and the antenna; and the second steering portion supports another core and another pickup coil.

8. The carriage conveying system as set forth in claim 7, wherein the modem is supported on the support member of the first steering portion and is opposed to the core.

9. The carriage conveying system as set forth in claim 4, wherein the feeder cable includes two parts, one defining an ingoing line and one defining an outgoing line, wherein the lines extend parallel with each other.

10. The carriage conveying system as set forth in claim 9, wherein the antenna is located between the ingoing line and the outgoing line.

11. The carriage conveying system as set forth in claim 9, wherein the pickup coil is located between the ingoing line and the outgoing line.

12. The carriage conveying system as set forth in claim 5, wherein the controller outputs second communication signals for transmission to the conveyance control device through the feeder cable, the antenna includes a receptor coil for receiving the first communication signals from the feeder cable and a transmission coil for transmitting the second signals to the feeder cable, and the receptor coil and the transmission coil are wound around the shaft portion of the cores together with the pickup coil.

13. The carriage conveying system as set forth in claim 12, wherein the pickup coil, the receptor coil, and the transmission coil are sequentially wound around substantially the entire shaft portion overlapping one another, the transmission coil being located at an outermost position.

14. The carriage conveying system as set forth in claim 12, wherein the pickup coil, the receptor coil, and the transmission coil are arranged in a row along the shaft portion, the transmission coil being located nearest to the feeder cable.

15. A carriage conveying system comprising a conveyance control device and a carriage, the conveyance control device outputting communication signals and supplying alternating current to the carriage by a feeder cable arranged along a guide rail for causing movement of the carriage along the guide rail and for controlling operation of the carriage, wherein the communication signals are transmitted to the carriage by the feeder cable, said carriage comprising:

a pickup coil for generating an induced electromotive force from the alternating current flowing through the feeder cable;

a driving device for driving the carriage by the induced electromotive force;

a controller for controlling the driving device in accordance with the communication signals; and an antenna for receiving the communication signals from the feeder cable for conveyance to the controller and the, wherein the antenna is located in the vicinity of the pickup coil.

16. The carriage conveying system as set forth in claim 15, wherein the carriage includes a core made from a magnetic material, and the pickup coil is attached to the core.

17. The carriage conveying system as set forth in claim 16, wherein the core includes a substantially E-shaped cross section and a shaft portion arranged at the middle of the core, the pickup coil being wound around the shaft portion.

18. The carriage conveying system as set forth in claim 16, wherein the feeder cable includes two parts, one defining an ingoing line and one defining an outgoing line, wherein the lines extend parallel with each other.

19. The carriage conveying system as set forth in claim 18, wherein the antenna is located between the ingoing line and the outgoing line.

20. The carriage conveying system as set forth in claim 18, wherein the pickup coil is located between the ingoing line and the outgoing line.

21. The carriage conveying system as set forth in claim 20, wherein the controller outputs second communication signals for transmission to the conveyance control device through the feeder cable, the antenna includes a receptor coil for receiving the first communication signals from the feeder cable and a transmission coil for transmitting the second communication signals to the feeder cable, and the receptor coil and the transmission coil are wound around the shaft portion of the core together with the pickup coil.

22. The carriage conveying system as set forth in claim 21, wherein the pickup coil, the receptor coil, and the transmission coil are sequentially wound around substantially the entire shaft portion overlapping one another, the transmission coil being located at an outermost position.

23. The carriage conveying system as set forth in claim 21, wherein the pickup coil, the receptor coil, and the transmission coil are arranged in a row along the shaft portion, the transmission coil being located nearest to the feeder cable.

24. A carriage conveying system comprising:
   a conveyance control device for outputting communication signals and electric power;
   a guide rail including a curved section;
   a feeder cable arranged along the guide rail for receiving the communication signals from the conveyance control device; and
   a carriage comprising:
   a traveling wheel for traveling along the guide rail;
   a steering device located in the vicinity of the guide rail for supporting the traveling wheel, the steering device being pivotally supported on the carriage for steering the traveling wheel in accordance with the curved section of the guide rail;
   a driving device for driving the carriage by driving the traveling wheel in accordance with the electric power;
   a controller for controlling the driving device in accordance with the communication signals; and
   a communicating device for receiving the communication signals from the feeder cable in a non-contact manner for conveyance to the controller, the communicating device being located on the steering device.

25. A carriage for moving along a guide rail based on communication with a conveyance control device, wherein the conveyance control device outputs communication signals and electric power, and wherein the communication signals and the electric power are transmitted to the carriage by a feeder cable arranged along the guide rail, the carriage comprising;
   a driving device for driving the carriage in accordance with the electric power;
   a controller for controlling the driving device in accordance with the communication signals;
   an antenna for receiving the communication signals from the feeder cable in a non-contact manner, the antenna being located adjacent to the feeder cable; and
   a modem for transmitting the communication signals from the antenna to the controller, the modem performing an analog/digital conversion of the communication signals when transmitting the communications signals.

* * * * *